United States Patent

[11] 3,593,140

[72] Inventor Hisashi Kaneko
Tokyo, Japan
[21] Appl. No. 821,667
[22] Filed May 5, 1969
[45] Patented July 13, 1971
[73] Assignee Nippon Electric Company, Limited
Tokyo, Japan
[32] Priority May 10, 1968
[33] Japan
[31] 43/31403

[54] PCM TRANSMISSION SYSTEM EMPLOYING PULSE REGENERATORS
3 Claims, 3 Drawing Figs.

[52] U.S. Cl. .......... 325/13, 325/3
[51] Int. Cl. .......... H04b 7/18
[50] Field of Search .......... 325/13, 38, 3, 5; 179/15, 170

[56] References Cited

UNITED STATES PATENTS

| | | | |
|---|---|---|---|
| 2,797,340 | 6/1957 | Bennett | 179/15 APR |
| 2,981,796 | 4/1961 | Lange | 325/13 |
| 2,992,341 | 7/1961 | Andrews et al. | 179/15 APR |
| 3,179,889 | 4/1965 | King | 325/38 |

*Primary Examiner*—Robert L. Griffin
*Assistant Examiner*—Albert J. Mayer
*Attorney*—Hopgood and Calimafde

ABSTRACT: A method and apparatus for reducing the pulse jitter encountered in a pulse code modulated (PCM) transmission path is described. A timing wave is superimposed on a PCM pulse train and utilized to initiate regeneration of pulses at spaced intervals along the transmission path. The pulse jitter is significantly reduced by alternating the polarity or selecting the phase of the timing wave as it is reimposed on regenerated pulses.

PATENTED JUL 13 1971 3,593,140

*INVENTOR*
Hisashi Kaneko by
Sandoe, Hopgood & Calimafde
ATTORNEYS

PCM TRANSMISSION SYSTEM EMPLOYING PULSE REGENERATORS

This invention relates to a system for the transmission of pulse code modulated (PCM) signals using many pulse regenerators along a transmission path such as a cable route.

An outstanding feature of this invention is the realization of an ideal timing system which is substantially unaffected by an irregular or defective synchronizing pulse code pattern. This is achieved by suitably alternating from one repeater to another the manner in which a timing signal is superimposed on a PCM pulse train. The timing signal for each repeater is derived from a PCM pulse train arriving at the repeater wherein the PCM pulse train contains a superimposed timing pulse component of clock frequency $f_o$ or $f_o/2$. At each repeater the timing signal is derived or extracted with a linear extracting circuit and selectively reimposed on the regenerated pulse train at the output of the repeater for transmission to the next repeater.

The advantage of this invention is particularly obtained in a PCM transmission system composed of a chain of regenerative pulse repeaters, because the accumulation of jitter, known as 'systematic jitter,' can be greatly reduced. A highly noteworthy effect of this invention will be evidenced when it is applied to a self-time multilevel PCM transmission system.

It is, therefore, an object of this invention to provide an improved PCM transmission system using many pulse regenerators wherein pulse jitter can be markedly reduced as compared with convention PCM transmission systems.

It is another object of this invention to provide a PCM transmission system featured by stable operation that is substantially unaffected by pulse pattern variations, and which provides improved signal transmission quality especially for long chains of pulse regenerative repeaters.

It is still another object of this invention to provide a PCM pulse repeater transmission system in which each pulse regenerative repeater is simplified.

It is still further an object of this invention to provide a method of transmitting PCM digital signals with reduced pulse jitter.

The foregoing and other objects, features and advantages of this invention will be apparent from the following description of several embodiments of the invention taken in conjunction with the accompanying drawings, the description of which follows.

Figure 1:
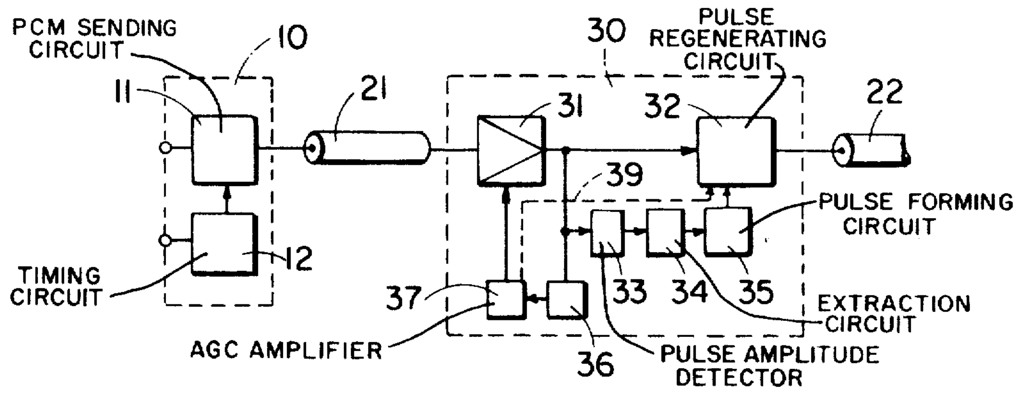
FIG. 1 (PRIOR ART)
FIG. 1 is a schematic illustration of a conventional PCM repeatered transmission system.

Referring to FIG. 1, 10 denotes a transmitting terminal for converting input information into binary, ternary, quinary, or higher multilevel PCM pulses by a sending circuit 11 for retransmission of the PCM pulses over a cable 21. The reference number 12 denotes a timing circuit for generating the clock pulses at frequency $f_o$ for accurate timing of the PCM train from the sending circuit 11. The reference numeral 30 denotes a typical regenerative repeater in the repeater chain; while 31 denotes an equalizing amplifier for amplifying and reshaping the input PCM pulses. This equalizing amplifier may be exemplified by the preamplifier described in U.S. Pat. No. 2,992,341. The numeral 32 denotes a pulse regenerative circuit composed of blocking oscillators, etc. and for regenerating PCM pulses in an orderly form for retransmission over cable 22.

The equalizing amplifier 31 output is simultaneously applied to a timing circuit consisting of a nonlinear extraction circuit 33, a timing-wave-extraction circuit 34, and a pulse-forming circuit 35 such as a blocking oscillator, a monostable multivibrator, or the like; and an AGC circuit consisting of a pulse-amplitude-detection circuit 36 and an AGC amplifier 37. The timing circuit 12 converts the input pulse waveform into a train of pulses containing the clock frequency component $f_o$ by the nonlinear extraction circuit 33 composed of full-wave rectifier. Thus, a sinusoidal component of frequency $f_o$ is extracted from the pulse train by means of the timing-wave-extraction circuit 34 containing a tank circuit tuned to $f_o$. The extracted component is converted by the pulse-forming circuit 35 into timing pulses for driving the pulse-regenerative circuit 32.

On the other hand, the equalized and amplified PCM waveform is converted into an amplitude-representing DC component by the pulse-amplitude-detection circuit 36 generally composed of a conventional peak detector employing diodes, which constitutes a part of the AGC circuit. This DC component supplied through the AGC amplifier 37 functions as a bias for controlling the gain of the equalizing amplifier 31 so that its output is maintained substantially constant. Instead of an AGC system, an ATC (Automatic Threshold Control) system may be adapted for varying a threshold voltage of the pulse regenerative circuit 32 by use of a route as shown by the dotted line 39 in FIG. 1.

A great advantage of such conventional PCM transmission systems resides in that the timing information can be extracted from the received information-bearing coded pulses without resorting to local independent pulse generation at the receiving end or adding a separate pulse or frequency transmission from the sending terminal. But this technical advantage is inevitably accompanied by a disadvantage involved in nonlinear extraction. This disadvantage is due to pulse jitter present in the pulse pattern, and results in a timing deviation in the timing circuits 33, 34 and 35. As is well known, when a great number of identical repeaters are connected in tandem, the pattern jitters arising in the individual repeaters manifest similar tendencies with individual jitters tending to accumulate into a large amount of jitter through a long chain of repeaters.

Another source of trouble in the conventional repeater of FIG. 1 is that the defective (high pulse jitter) synchronization pulse pattern causes the AGC signal voltage to correspondingly vary, thus increasing the code error rate and further deteriorating jitter characteristics.

The foregoing problems have posed a critical problem in conventional pseudo-ternary code transmissions (bipolar code transmissions). These problems will especially aggravate the transmission of more complex pulse configurations such as higher-than-ternary multilevel pulses.

Accordingly, it is a principal object of this invention to eliminate the above-mentioned defects of conventional PCM transmission systems. More particularly, the present invention intends to reduce jitter accumulation in a chain of regenerative pulse repeaters.

Figure 2:
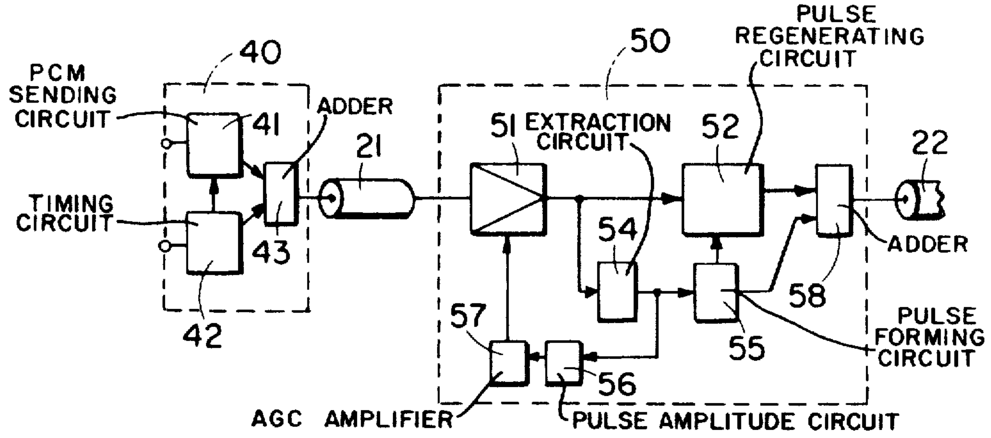
FIG. 2 is a schematic illustration of a preferred embodiment of a regenerative repeater coupled to a transmitting terminal to which the principles of this invention are applied.

Referring to FIG. 2, it will be understood that the sending circuit 41 and the timing circuit 42 are substantially the same in circuit structure and performance as 11 and 12 of FIG. 1, respectively. The only difference is that a sinusoidal or pulsed timing wave at clock frequency $f_o$ as the output of the timing circuit 42 is superimposed upon a PCM pulse train by means of an adder 43. An equalizing amplifier 51 and a pulse regenerative circuit 52 in the regenerative repeater 50 are respectively the same in circuit structure and performance as 31 and 32 shown in FIG. 1. AT first, the received PCM pulses containing the timing wave are equalized and amplified by the equalizing amplifier 51 to a clean pulse form and then the same pulses as those transmitted from the sending circuit 41 are regenerated by the pulse regenerative circuit 52 and provided with a code discriminating function so that the regenerated pulse train may be passed on to the next repeater over cable 22.

The timing circuit consists, as mentioned above, of a timing-wave-extraction circuit 54 and a pulse-forming circuit 55 such as a blocking oscillator or a monostable multivibrator similar to the pulse-forming circuit 35 in FIG. 1. The timing-wave-extraction circuit 54 containing a tank circuit tuned to $f_0$ linearly extracts the $f_0$ component from the transmitted PCM pulses upon which the timing-wave component at $f_0$ has been superimposed. The pulse-forming circuit 55 converts the output of 54 into timing pulses for driving the pulse regenerative circuit 52. A sinusoidal or pulsed timing wave of frequency $f_0$ appears at the output of the pulse-forming circuit 55 and is superimposed upon PCM pulses from the circuit 52 by use of a combiner 58. The superimposed waveform from combiner 58 is passed on to the next repeater.

The amplitude of the $f_0$ component at the output of circuit 54 is detected by a pulse amplitude detection circuit 56 and a DC bias voltage proportional to the amplitude is fed back via AGC amplifier 57 to the equalizing amplifier 51 so that its output is maintained constant.

The present invention will find application in any PCM transmission system. The timing wave must be superimposed upon the PCM pulsed waveform at the transmitting terminal side and at each repeater sending point. Accordingly, this invention should in no way preclude its application to a case where the timing wave at frequency $f_0/2$ is superimposed upon PCM pulses for pulsed code transmission at a frequency $f_0/2$. (Ref.: Japanese Pat. application 41250/1968.)

Figure 3:
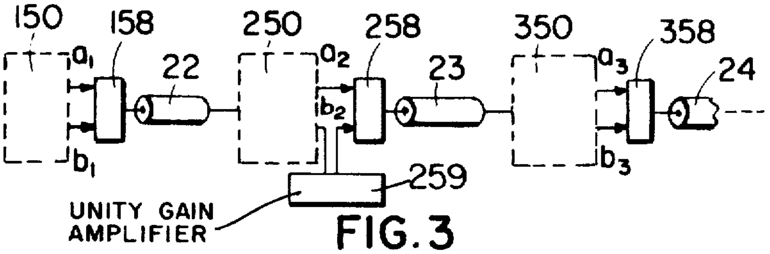
FIG. 3 is a schematic illustration of a preferred embodiment of this invention comprising a chain of regenerative repeaters shown in FIG. 2.

As previously stated, a principal object of this invention, the decrease of pulse jitter is obtained by selectively alternating the superimposing of the timing wave from one repeater to another. This is accomplished as follows:

Referring to the embodiment shown in FIG. 3, numerals 150, 250 and 350 represent respectively regenerative repeaters each as illustrated by the numeral 50 in FIG. 2 excluding the combiner 58. PCM outputs of these repeaters are respectively combined with timing-wave outputs by the combiners 158, 258 and 358 so that the combined outputs may be transmitted over cables 22, 23 and 24. It is assumed here that the PCM outputs and the timing-wave outputs of the regenerative repeaters 150, 250 and 350 are denoted respectively by $a_1$, $a_2$, $a_3$ and $b_1$, $b_2$, $b_3$. Then, when the repeaters are properly operated, there should be a relationship $a_1=a_2=a_3$. If there exists another relationship $b_1=b_2=b_3$ among the timing waves at all times, jitters occurring in the individual repeaters will be added together, assuming that all repeaters in the total system are identical. However, jitter will certainly be reduced as will be clarified, provided that the repeaters are so connected in tandem that the polarities of the extracted timing waves are alternatively reversed. While the repeater 250 extracts the timing-wave component $b_1$ from the sum of PCM pulse $a_1$ and timing wave $b_1$, or $(a_1+b_1)$, pulse $a_1$ works as a randomly disturbing component, or as a cause of jitter, against timing wave $b_1$. Suppose that the timing-wave output of the second repeater is superimposed upon the PCM pulses after polarity reversal as expressed by $b_2=-b_1$. This is achieved, for example, by a polarity reversal circuit 259 such as one stage of amplifier whose gain is equal to unity. Then, the relationship $a_2+b_2a_1-b_1=A1(b_1-{}_1)$ holds. In other words, the disturbing component of $(b-a)$ against the timing wave component $b_1$ becomes $-a_1$ and this works as a cause of jitter.

Assuming that each of the timing waves $b_1$, $b_2$, and $b_3$ is a periodic wave and each of the timing circuits incorporated in repeaters 150, 250 and 350 is of the linear extraction type. In the most simple case, jitter occurring in the second repeater 250 which operates by the input $(b_1+a_1)$ and that occurring in the third repeater which operates by the input $(b_1-a_1)$ will be opposite in polarity and thus cancel each other to become nil.

It is admitted that complete elimination of jitter is difficult because jitter characteristics of the timing circuit related to the pattern jitter, as a practical matter, cannot be designed to be identical among repeaters. However, it is possible to reduce the jitter accumulation to an appreciable degree.

A conspicuous effect as mentioned above could scarcely be expected, as will be readily surmized by one skilled in the art, in cases where timing waves $b_1$, $b_2$,—each at frequency $f_0/2$ are superimposed upon respective PCM pulse trains, because nonlinear timing-wave extraction would have to be employed. Nevertheless, it can be safely said that the in-phase jitter component is eliminated, though the jitter reducing effect may be more or less sacrificed.

Besides the alternate polarity reversal as mentioned with reference to FIG. 3, any other suitable combinations of polarity reversal such as (+++−−−+++−−−) will be equally effective, provided the jitter causes are cancelled as a whole, because the jitter amplitudes are generally small. Instead of employing reverse polarities differing 180° from each other, the superimposition of timing waves differing 360°/$n$ in phase angle from one another may be adopted for a chain of $n$ regenerative repeaters utilizing linear extraction. For instance, the jitter components could be eliminated by superimposing timing waves at phase angles 0°, 90°, 180° and 270° upon respective PCM pulse trains at outputs of four successive regenerative repeaters. It is considered, however, that polarity reversal gives the most practicable and easiest method.

As has been fully explained, the present invention brings about a great deal of remarkable technical advantage in providing a high-quality PCM transmission system with a reduced jitter accumulation by suitably varying phase or polarity relationships of the timing waves with respect to the PCM pulses from repeater to repeater for the purpose of jitter cancellation.

I claim:

1. A PCM transmission system for transmitting digital signals, comprising a plurality of regenerative pulse repeaters each having means for providing an input digital signal, means coupled to said input signal providing means for extracting a first timing wave from said input signal, means coupled to said extracting means and responsive to the extracted first timing wave for generating a second timing wave regenerating means coupled to said input signal providing means and to said second timing wave generating means for producing regenerated digital pulses and means coupled to said regenerating means and said second timing wave generating means for combining said regenerated digital pulses and said second timing wave; wherein the phase of the second timing wave in at least one of said regenerative pulse repeaters is of substantially opposite polarity with respect to the second timing wave in at least one of an immediately preceding or succeeding one of said regenerative pulse repeaters.

2. The system as recited in claim 1, wherein the frequency of said second timing wave is equal to the transmission rate of said digital pulses.

3. The system as recited in claim 1, wherein the frequency of said second timing wave is equal to an integral division of the transmission rate of said digital pulses.